3,065,226
20-KETAL DERIVATIVES OF 1-METHYL-3-ALK-
OXY-17-ACETYL-1,3,5(10)-ESTRATRIENE
Howard J. Ringold, Franz Sondheimer, and George Rosenkranz, Mexico City, Mexico, Gilbert Stork, Leonia, N.J., and Carl Djerassi, Birmingham, Mich., assignors, by mesne assignments, to Syntex Corporation, a corporation of Panama
No Drawing. Filed Nov. 30, 1955, Ser. No. 550,204
Claims priority, application Mexico Dec. 10, 1954
4 Claims. (Cl. 260—239.55)

The present invention relates to novel cyclopentanophenanthrene derivatives and to a novel process for the preparation thereof.

More particularly, the present invention relates to a novel progestational hormone, namely 1-methyl-19-nor-$^4\Delta$-pregnene-3,20-dione (1-methyl-19-nor-progesterone), to a novel process for the preparation thereof and to certain novel intermediates.

The novel product of the present invention is a progestational hormone and exhibits the characteristics and biological activity of this type of hormone and is in some respects superior to progesterone and/or other hormones of this type.

In accordance with the present invention it has been discovered that the known compound 1-methyl-3-hydroxy-17-acetyl-1,3,5(10)-estratriene, which has been described by Djerassi et al., J.A.C.S., 73, 1527 (1951), may be transformed into its novel alkyl ethers and that these alkyl ethers upon reaction with an alkali metal, such as sodium or lithium in solution of liquid ammonia, are converted into the novel 1-methyl-3-alkoxy-19-nor-$\Delta^{2,5(10)}$-pregnadiene-20-ol. It has further been discovered that this latter compound, upon hydrolysis and rearrangement in acid medium, forms the corresponding novel intermediate 1-methyl-19-nor-$\Delta^4$-pregnene-20-ol-3-one which can be oxidized with a suitable oxidizing agent into the desired 1-methyl-19-nor-$\Delta^4$-pregnene-3,20-dione.

Further, in accordance with the present invention, a modification of the just described process may be practiced which involves the formation of 20-ethyleneketal of the alkyl ether of 1-methyl-3-hydroxy-17-acetyl-1,3,5(10)-estratriene. When the 20-ethylene ketal is treated with an alkali metal in a liquid ammonia there is produced the corresponding 20-ethyleneketal of 1-methyl-3-methoxy-19-nor-$\Delta^{2,5(10)}$-pregnadiene-20-one which can be arranged with dilute acid and simultaneously hydrolyzed at C–20 to yield the same 1-methyl-19-nor-progesterone.

A portion of the process of the present invention is exemplified as follows:

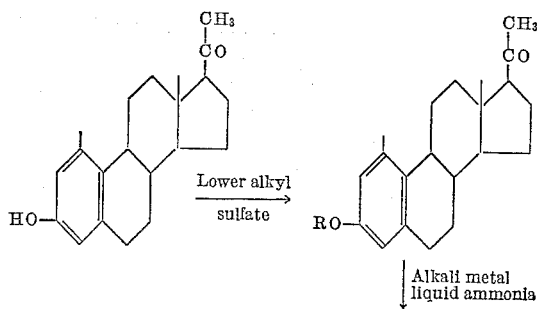

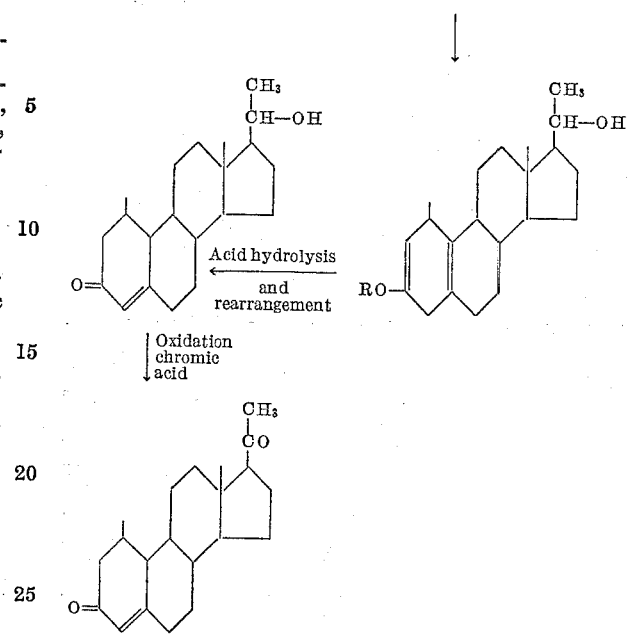

In the above equation, R represents an alkyl group, preferably a lower alkyl group such as methyl or ethyl.

In practicing the process above outlined, the known compound 1-methyl-3-hydroxy-17-acetyl-1,3,5(10)-estratriene is dissolved in an organic solvent such as ethanol and treated with an alkali such as alkali metal hydroxide, as for example potassium hydroxide, and with an alkylating agent preferably an alkyl sulfate such as methyl sulfate. Preferably the reaction mixture is refluxed for a substantial period of time as for example two hours and is then poured into water containing mineral acid such as concentrated hydrochloric acid. The precipitate which collects is then washed to neutral. The resultant precipitate is purified to give the desired 1-methyl-3-alkoxy-17β-acetyl-1,3,5(10)-estratriene.

For the second step of the process outlined, the alkyl ether derived from the first step is dissolved in an organic solvent such as Dowanol 33, a glycol monoether, and then added to anhydrous liquid ammonia. Thereafter an alkali metal such as lithium metal in the form of wire is added, or sodium metal, and the solution stirred as for example for a period of one hour. Water is then added and the solution concentrated under vacuum, cooled and extracted with an organic solvent, such as benzene. Upon evaporation of the filtered benzene solution there is produced the alkyl ether of 1-methyl-19-nor-$\Delta^4$-pregnene-20-ol-3-one. This ether is then hydrolyzed with suitable acid, as for example p-toluenesulfonic acid, to give the corresponding 1-methyl-19-nor-$\Delta^4$-pregnene-20-ol-3-one. The product thus produced is then oxidized with a suitable oxidizing agent capable of oxidizing secondary alcohols to ketones, as for example, chromic acid in acetic acid. The resultant product is 1-methyl-19-nor-$\Delta^4$-pregnene-3,20-dione (1-methyl-19-nor-progesterone).

A modified process according to the present invention is outlined in the following equation:

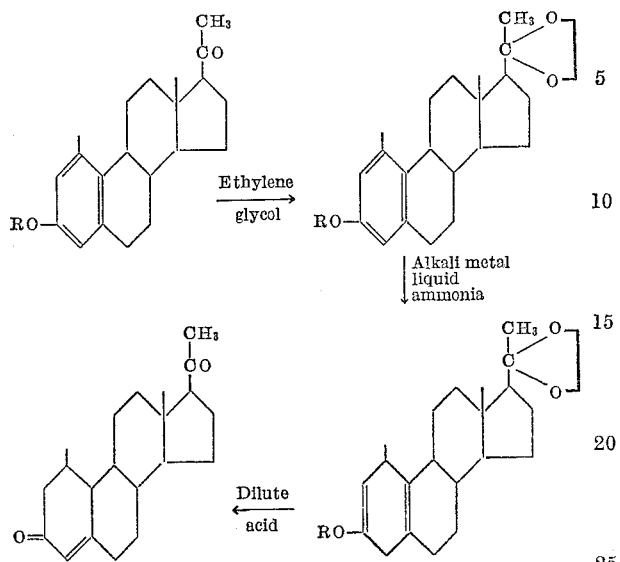

In the above equation R represents an alkyl group, preferably a lower alkyl group such as methyl or ethyl.

In accordance with the process just above outlined, the 1-methyl-3-alkoxy-17β-acetyl-1,3,5(10)-estratriene is dissolved in an organic solvent such as benzene and mixed with ethylene glycol together with a catalytic amount of p-toluenesulfonic acid. The mixture is then refluxed for a period of time of approximately one day with continuous removal of the water formed during the reaction. At the end of this period, the solution is neutralized, dried and evaporated to yield the ethyleneketal of 1 - methyl-3-alkoxy - 17β - acetyl-1,3,5(10)-estratriene. The ethyleneketal thus produced is then treated in exactly the same way as the free compound, i.e. reduced with anhydrous liquid ammonia and lithium metal, to give the corresponding 20-ethyleneketal of 1-methyl-3-methoxy-19-nor-$\Delta^{2,5(10)}$-pregnadiene-20-one. This product is then treated with dilute acid, such as p-toluenesulfonic acid, to simultaneously reconstitute the 20-keto group and rearrange ring A to give the same 1-methyl-19-nor-progesterone previously referred to.

The following specific examples serve to illustrate but are not intended to limit the present invention:

*Example I*

0.6 g. of 1-methyl-3-hydroxy-17-acetyl-1,3,5(10)-estratriene (prepared in accordance with the method of Djerassi et al., J.A.C.S., 73, 1527 (1951)) was dissolved in 36 cc. of ethanol and the solution was treated alternatively with 3 portions of each of a solution of 4.5 g. of potassium hydroxide in 4.5 cc. of water and then with 4.5 cc. of methyl sulfate. The mixture was refluxed for two hours, thereafter poured into water containing 2 cc. of concentrated hydrochloric acid and the precipitate was collected and washed to neutral. The product was dissolved in ether and the ether solution was washed with 10% sodium hydroxide solution and water until neutral, dried over anhydrous sodium sulfate, filtered and evaporated to dryness under vacuum, thus yielding 0.33 g. of 1-methyl-3-methoxy-17β-acetyl-1,3,5(10)-estratriene.

*Example II*

A solution of 1 g. of 1-methyl-3-methoxy-17β-acetyl-1,3,5(10)-estratriene, obtained in accordance with Example I, in 20 cc. of benzene was mixed with 4 cc. of ethylene glycol previously distilled over potassium hydroxide and 200 mg. of p-toluenesulfonic acid and the mixture was refluxed for 20 hours with the use of an adapter for the continuous removal of the water formed during the reaction. At the end of the 20 hours the solution was neutralized with a saturated solution of sodium bicarbonate, washed with water until neutral, dried with anhydrous sodium sulfate and evaporated to dryness under vacuum, thus yielding 1.1 g. of the ethyleneketal of 1-methyl-3-methoxy-17β-acetyl-1,3,5(10)-estratriene.

*Example III*

A cooled solution of 0.35 g. of the 20-ethyleneketal of 1-methyl-3-methoxy - 17β - acetyl-1,3,5(10)-estratriene in 20 cc. of Dowanol 33 was added to 30 cc. of anhydrous liquid ammonia and then 0.5 g. of lithium metal in the form of wire was added and the solution was stirred for one hour. Water was added and the solution was concentrated under vacuum, cooled and extracted with benzene. The benzene solution was washed to neutral, dried with anhydrous sodium sulfate, filtered and evaporated to dryness.

The reaction product (the 20-ethyleneketal of 1-methyl-3-methoxy-19-nor-$\Delta^{2,5(10)}$-pregnadien-20-one) was dissolved in 10 cc. of acetone and mixed with 0.25 g. of p-toluenesulfonic acid. After 15 hours' standing at room temperature, the mixture was poured into water, extracted with ethyl acetate, washed with water until neutral, dried over anhydrous sodium sulfate and evaporated to dryness under vacuum, thus affording 1-methyl-19-nor-$\Delta^4$-pregnene-3,20-dione (1 - methyl-19-nor-progesterone). Melting point 150°–152° C. $[\alpha]_D$ +88° (chloroform).

*Example IV*

0.35 g. of 1-methyl-3-methoxy-17β-acetyl-1,3,5(10)-estratriene was treated by the method of Example III for the 20-ethyleneketal, to give 1-methyl-19-nor-$\Delta^4$-pregnen-20-ol-3-one. Melting point 244°–247° C., $[\alpha]_D$ +41° (chloroform).

*Example V*

1 g. of 1-methyl-19-nor-$\Delta^4$-pregnen-20-ol-3-one was dissolved in 50 cc. of glacial acetic acid and the temperature of the solution was adjusted to 15° C. A solution of 0.34 g. of chromic acid in 5 cc. of 80% acetic acid was then slowly added under stirring and the mixture was kept standing for 45 minutes. After pouring into water the precipitate formed was filtered and washed to neutral with sodium bicarbonate solution and with water. Recrystallization from ether afforded 1-methyl-19-nor-$\Delta^4$-pregnene-3,20-dione (1 - methyl-19-nor-progesterone), identical to the one obtained in accordance with Example III.

We claim:

1. The 20-ethyleneketal of 1-methyl-3-alkoxy-17β-acetyl-1,3,5(10)-estratriene.
2. The 20-ethyleneketal of 1-methyl-3-methoxy-17β-acetyl-1,3,5(10)-estratriene.
3. The 20-ethyleneketal of 1-methyl-3-alkoxy-19-nor-$\Delta^{2,5(10)}$-pregnadiene-20-one.
4. The 20-ethyleneketal of 1-methyl-3-methoxy-19-nor-$\Delta^{2,5(10)}$-pregnadiene-20-one.

References Cited in the file of this patent

UNITED STATES PATENTS

| 2,759,951 | Djerassi et al. | Aug. 21, 1956 |
| 2,781,365 | Djerassi et al. | Feb. 12, 1957 |
| 2,925,428 | Djerassi et al. | Feb. 16, 1960 |

OTHER REFERENCES

Rosenkranz et al.: Journal of Am. Chem. Soc., vol. 73 (1951), pp. 3540–1 relied on.

Tullner et al.: Endocrinology, vol. 52 (1953), pp. 359–361 relied on.